Oct. 14, 1924.  
F. H. ROYCE  
1,511,910  
CHANGE SPEED MECHANISM FOR MECHANICALLY PROPELLED VEHICLES  
Filed May 14, 1924

Inventor:  
Frederick Henry Royce  
by his Attorney:

Patented Oct. 14, 1924.

1,511,910

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

CHANGE-SPEED MECHANISM FOR MECHANICALLY-PROPELLED VEHICLES.

Application filed May 14, 1924. Serial No. 713,281.

*To all whom it may concern:*

Be it known that I, FREDERICK HENRY ROYCE, residing at Derby, England, a subject of the King of Great Britain and Ireland, have invented certain new and useful Improvements in Change-Speed Mechanism for Mechanically-Propelled Vehicles, of which the following is a specification.

This invention has reference to the change speed gear mechanism of mechanically propelled vehicles, and has for its object to construct the hand operated gear controlling lever so that its position or angle of inclination can be varied and adjusted to suit different arrangements of the bodies and drivers' seats.

Figure 1:
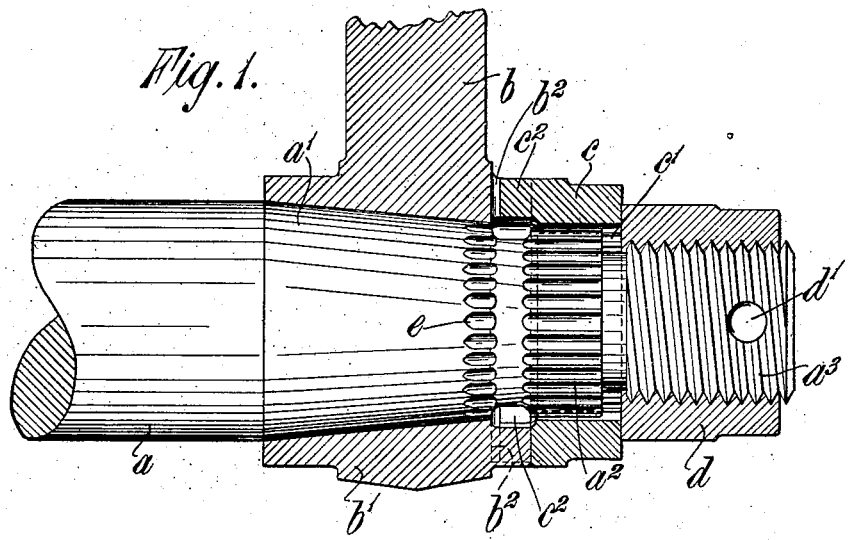
Figure 2:
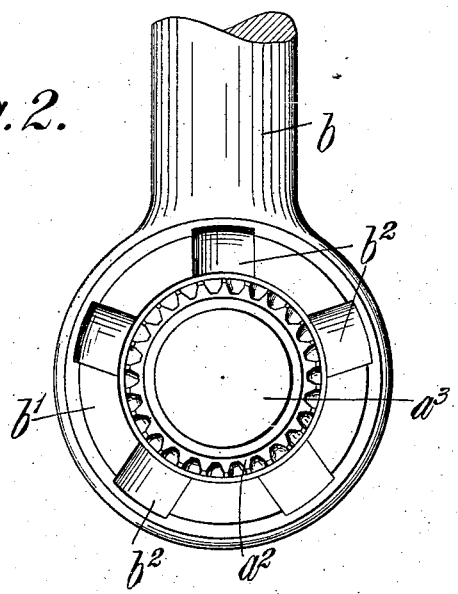

The accompanying drawings show an example of my invention, Fig. 1 being an elevation with parts in section of the end of the gear operating shaft with part of the control lever, and Fig. 2 an end elevation viewed from the right of Fig. 1 with certain parts removed.

In said drawings the reference letter $a$ designates the gear operating shaft having a tapered portion $a^1$ and a further portion provided with axial serrations $a^2$ formed thereon and a terminal threaded end $a^3$. $b$ designates the gear control lever having a boss $b^1$ through which extends a tapered bore corresponding to the tapered portion $a^1$ of the gear operating shaft $a$ and having formed on its outer face recesses $b^2$.

$c$ designates a washer, sleeve, or similar member provided with internal axial serrations $c^1$ corresponding to the serrations $a^2$ on the shaft $a$ and having formed on its face which is in contact with the lever boss $b^1$ dogs or jaws $c^2$ adapted to fit in or engage the recesses $b^2$ of said lever boss.

The axial serrations $a^2$ in the embodiment illustrated are twenty-six in number and the recesses $b^2$ five in number as clearly shown in Fig. 2.

The number of the teeth or serrations $a^2$ on the shaft, the internal circumference of the sleeve or washer $c$ and the number of dogs or projections $c^2$ and recesses $b^2$ on the faces of the sleeve and lever boss respectively are selected to have no common factors so as to give a large number of possible positions.

$d$ designates a clamping nut having its outer end castellated and screwed on to the threaded end $a^3$ of the shaft $a$, which end is provided with a hole $d^1$ drilled therethrough to receive a locking split cotter which also traverses corresponding holes in the nut.

The serrations shown on Fig. 1 of the drawings at $e$ are tool marks forming no part of the invention.

With the parts constructed as above described the lever $b$ can be fitted on and moved along the shaft $a$ until its tapered portion is in contact with the portion $a^1$ of the shaft, and said lever can then be placed in the desired angular position in relation to the shaft. The sleeve $c$ can then be passed over the shaft end and the projections or dogs $c^2$ on the face of the sleeve caused to engage the recesses $b^2$ on the boss $b^1$ of the lever, the axial teeth or serrations $c^1$ of the sleeve also engaging the axial teeth or serrations $a^2$ on the shaft, thus securely locating the lever on the shaft in the desired position. If the dogs or projections $c^2$ will not engage the recesses $b^2$ on the lever in the selected position, by taking off the sleeve and replacing it after axially shifting it forward or backward to the extent of one or more serrations $c^1$, the ultimate position of the lever $b$ can be secured within 2.77 degrees of the required position which needless to say is negligible. The parts are then secured by screwing up the clamping nut $d$.

What I claim as my invention and desire to secure by Letters Patent of the United States is:—

Mechanism comprising a rotary shaft having a conical portion adjacent one end, and also having a cylindrical portion forming a continuation of the small end of the conical portion and provided with external serrations; a control lever for said shaft having a boss formed with a conical axial opening to receive the conical shaft portion, whereby said lever may be turned into the desired angular position with relation to said shaft and then shifted laterally toward the larger end of the conical shaft portion so as to bring the wall of its opening into frictional engagement with the surface of said conical shaft portion to clamp the two together; and a locking sleeve fitting on the serrated portion of the shaft and provided with internal serrations to engage the shaft serrations and thereby prevent rotation of the sleeve, the adjacent faces of the lever boss and the locking sleeve constituting companion interlocking parts to rigidly connect said sleeve to said boss, one of which parts is formed with a set of lateral projections and the other wtih complementary recesses to receive the same.

In witness whereof I have signed this specification.

FREDERICK HENRY ROYCE.